(12) United States Patent
Tucker

(10) Patent No.: US 7,410,324 B2
(45) Date of Patent: Aug. 12, 2008

(54) BIO-PASSAGE FOR DISRUPTING LAMINAR FLOW

(76) Inventor: Randall L. Tucker, 7440 Township Rd. 95, Findlay, OH (US) 45850

( * ) Notice: Subject to any disclaimer, the term of this patent is extended or adjusted under 35 U.S.C. 154(b) by 0 days.

(21) Appl. No.: 10/567,724

(22) PCT Filed: Aug. 9, 2004

(86) PCT No.: PCT/US2004/025634
§ 371 (c)(1),
(2), (4) Date: Sep. 21, 2006

(87) PCT Pub. No.: WO2005/014937
PCT Pub. Date: Feb. 17, 2005

(65) Prior Publication Data
US 2007/0189853 A1    Aug. 16, 2007

Related U.S. Application Data

(60) Provisional application No. 60/493,511, filed on Aug. 8, 2003.

(51) Int. Cl.
*E02B 3/00* (2006.01)

(52) U.S. Cl. .......................................... 405/80; 405/81

(58) Field of Classification Search .............. 405/80–83
See application file for complete search history.

(56) References Cited

U.S. PATENT DOCUMENTS

| | | | | |
|---|---|---|---|---|
| 126,257 | A | * | 4/1872 | Brewer ........................ 405/81 |
| 286,869 | A | | 10/1883 | Trammer |
| 4,629,361 | A | * | 12/1986 | Zimmerman ................. 405/83 |
| 4,657,434 | A | | 4/1987 | Woolnough |
| 5,161,913 | A | * | 11/1992 | Boylan ........................ 405/83 |
| 5,833,389 | A | * | 11/1998 | Sirovich et al. ............... 405/80 |
| 5,839,853 | A | * | 11/1998 | Oppenheimer et al. ........ 405/80 |
| 6,588,370 | B1 | | 7/2003 | Odeh |

* cited by examiner

*Primary Examiner*—Frederick L Lagman
(74) *Attorney, Agent, or Firm*—Fay Sharpe LLP

(57) ABSTRACT

An apparatus or biopassage (A) includes a housing (20) dimensioned for receipt in a waterway during an increased flow event. The housing has a passage: (26) that provides a region of reduced flow generally irrespective of the flow external to the passage. A flow disrupter (50) disturbs laminar flow in the waterway above the passage. A preferred embodiment of the disrupter includes surfaces (52, 54) disposed in angled relation relative to a common apex (60) located above a longitudinal opening (30passage. The surfaces include a series of peaks and valleys formed by angled planar portions (56) in one arrangement. A deflector (NC) is positioned upstream of an inlet end (40) of the passage to direct water away from the passage.

18 Claims, 5 Drawing Sheets

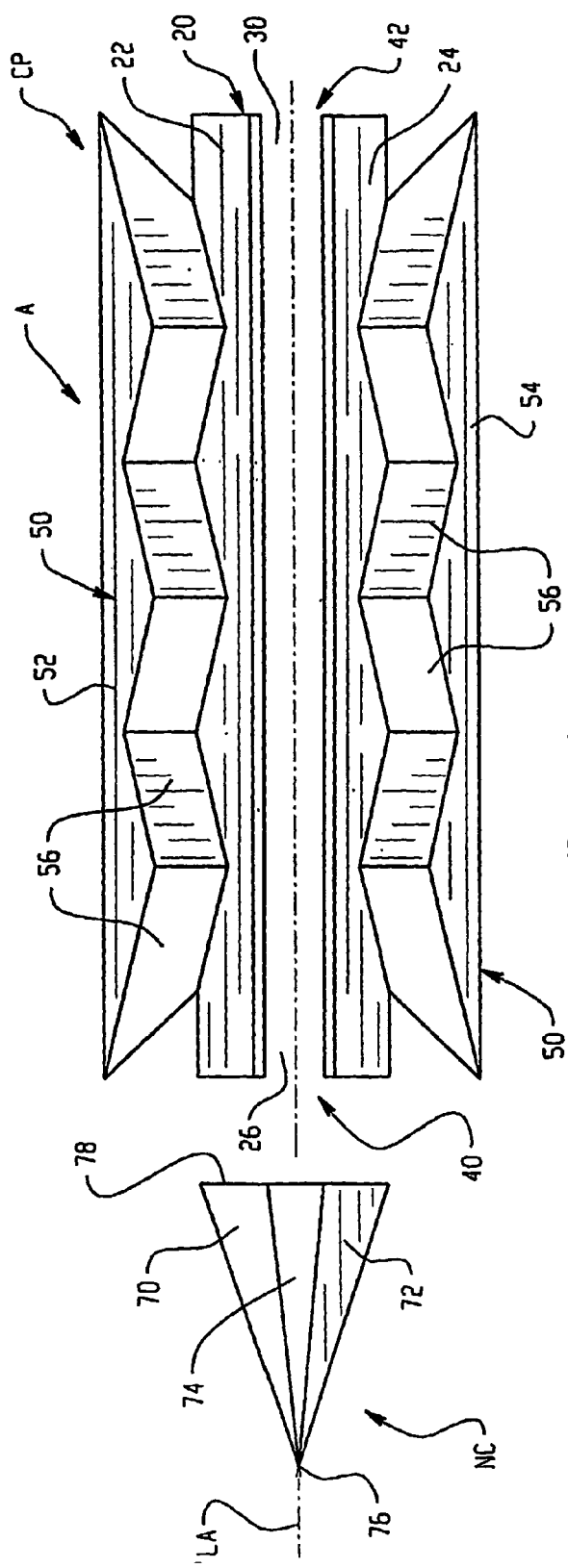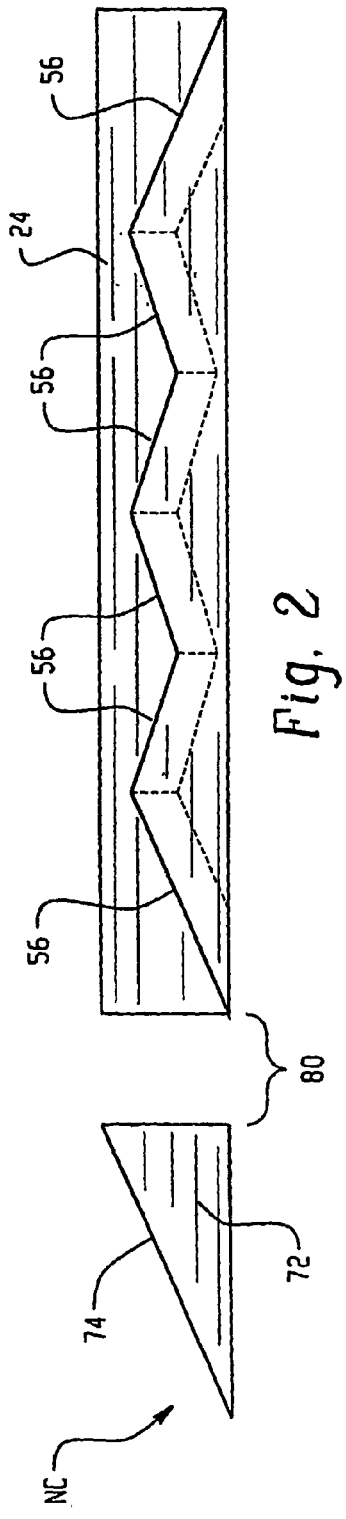

BIO-PASSAGE FOR DISRUPTING LAMINAR FLOW

This application claims the benefit of PCT patent application Ser. No. PCT/US04/025634, filed on 9 Aug. 2004 which claims the benefit of U.S. Provisional Patent Application Ser. No. 60/493,511, filed on Aug. 8, 2003.

BACKGROUND OF INVENTION

This application is directed to an apparatus for reducing flow through a housing to a significantly different rate or velocity than a flow exterior to the housing. The invention finds particular application in allowing passage of migrating fish, for example, under bridges, through road culverts, etc., where a waterway is confined to a confined region; however, the application will find use in related environments and applications.

It is not uncommon for a waterway or stream to be confined to a localized region where it passes beneath a bridge, through a road culvert, etc. During periods of heavy rainfall, for example, there is an attendant increase in the amount of water that flows through such regions, and the velocity in the waterway likewise increases. It is believed that fish have a tendency to migrate during such events. When encountering a narrow region during an increased flow event, the velocity or flow rate reaches a level that makes it difficult for the fish to pass through and the fish tend to cease their migration at these regions and these high flow events/regions become choke points.

Known structures are useful at channeling water through a confined region in order to provide protection to the road, bridge, or the like. Unfortunately, this only exacerbates the ability of fish to migrate through these regions. Thus, present arrangements simply do not provide a passage or region that is effective to reduce the velocity and allow the fish to more easily migrate therethrough, irrespective of the increased flow velocity in the stream or culvert.

Thus, a need exists for a passage, also referred to herein as a bio-passage, that improves migration for fish, and/or, reduces the flow in one region of the waterway generally irrespective of the flow external to that region, i.e., uninfluenced by external flow.

SUMMARY OF INVENTION

An apparatus is provided that reduces flow through a housing passage irrespective of flow external thereto.

More particularly, the apparatus limits flow velocity through the passage to improve migration for fish, particularly during high flow events.

The apparatus includes a housing having an elongated passage and at least one means that disrupts laminar flow over an opening in the passage. A deflector is located upstream of the passage and directs water over the passage.

Preferably, first and second outer surfaces include a series of peaks and valleys that are generally perpendicular to a common apex located above the passage.

A deflector or nosecone is located in spaced relation in advance of an inlet to the passage. The deflector includes surfaces that direct the waterway flow around the inlet to the passage.

A primary benefit of the invention is the ability to reduce the flow within the passage irrespective of the flow external to the apparatus.

Another benefit of the invention resides in the ease with which the assembly may be manufactured and installed.

Still another benefit is the improved environment for fish migration during high water or high flow events.

Still other advantages and benefits of the invention will become apparent to one skilled in the art upon reading and understanding the following detailed description.

BRIEF DESCRIPTION OF DRAWINGS

FIG. 1 is an overhead plan view of an apparatus in accordance with a preferred embodiment of the invention.

FIG. 2 is an elevational view thereof.

DETAILED DESCRIPTION OF THE INVENTION

Figure 3:
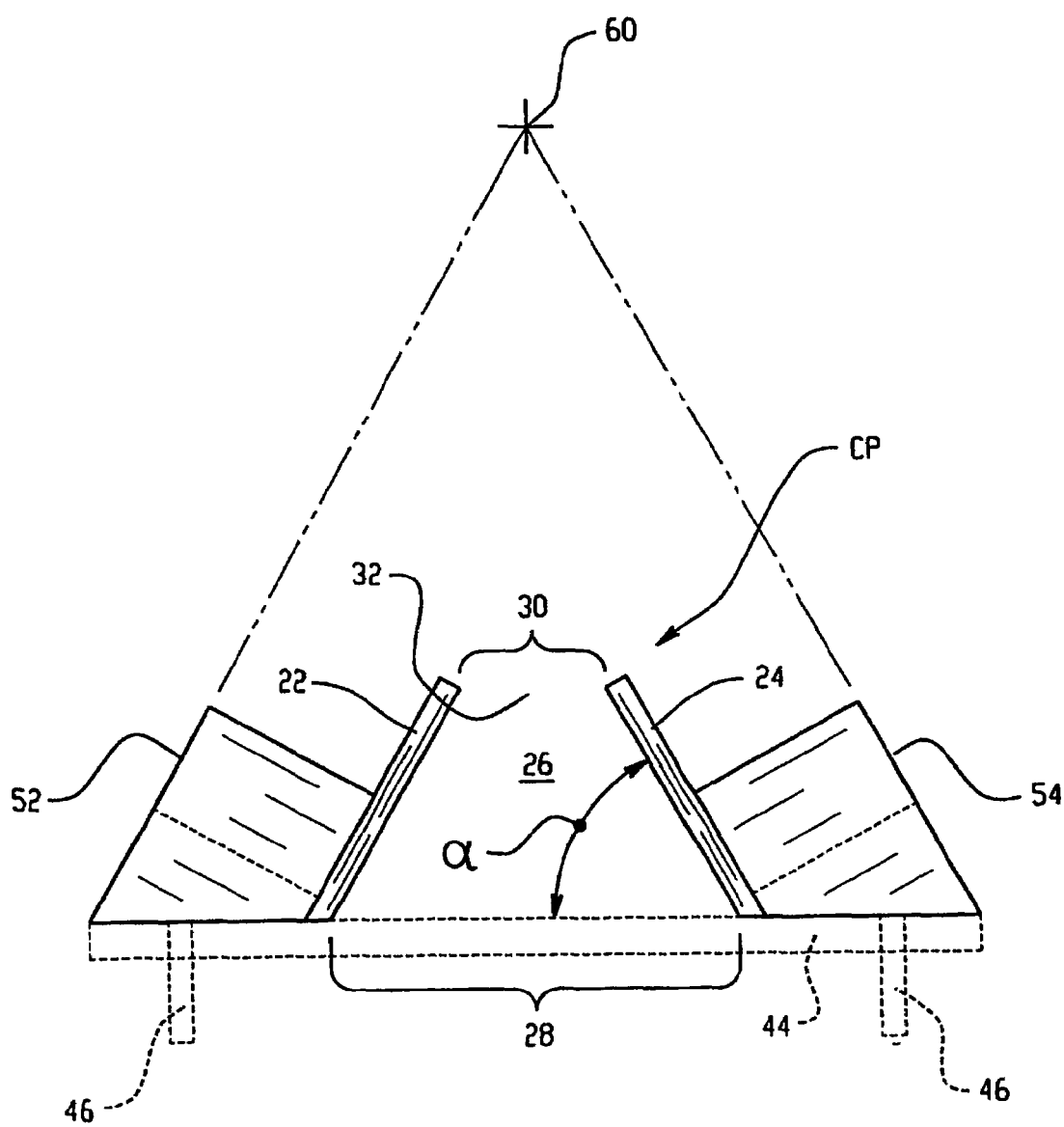
FIG. 3 is an end view of the channel portion of the apparatus.

Turning first to FIGS. 1-3, an apparatus, also referred to as a bio-passage assembly A is shown in plan view. It includes a channel portion CP and a deflector or nosecone portion NC.

More specifically, the channel portion CP includes a housing 20 which includes first and second sidewalls 22, 24. As evident in FIGS. 1-3, the sidewalls 22, 24 are disposed in angled relation and define a generally trapezoidal-shaped passage 26 (FIG. 3). That is, the passage is wider at a bottom portion 28 and narrower at an upper portion 30 that terminates in an opening 32. The opening preferably extends along the longitudinal extent of the channel portion. The passage has a first or inlet end 40 that communicates along the length of the channel portion with a second or outlet end 42 (FIG. 1). For reasons which will become more apparent below, this passage has a reduced velocity flow therethrough in comparison to the flow velocity of the remainder of the waterway in which the assembly is installed.

The sidewalls 22, 24 are shown as substantially planar components that maintain substantially the same cross-section throughout the length of the channel portion. This is desirable from a manufacturing standpoint, although it will be understood that the wall portions may adopt different configurations and do not necessarily require an unchanged cross-section throughout the length of the channel portion. Moreover, in FIGS. 1-3, the sidewalls are shown in angled relation to define the passage therebetween and opening 30 is formed at an upper end of the sidewalls where the sidewalls terminate in spaced relation. It will be appreciated, however, that the spaced relation may be maintained by physically interconnecting the first and second sidewalls. For example, interconnecting tie rods may be located at spaced locations along the length of the channel portion. Alternately, a lower planar component as represented by numeral 44 (FIG. 3) physically interconnects the sidewalls. Still further, the sidewalls can be individually mounted to a bottom surface of the associated waterway with fasteners as represented by pins 46. Securing the apparatus to the bottom surface of the waterway is helpful in maintaining the orientation of the assembly relative to the flow of the waterway. That is, a longitudinal axis LA of the housing is substantially aligned with the direction of flow of the waterway in which it is inserted.

The channel portion includes means 50 for disturbing or disrupting laminar flow in the associated waterway above the passage. In a first preferred embodiment, the disturbing means 50 includes first and second outer surfaces 52, 54 having a series of peaks and valleys such as formed by angled planar portions 56. As perhaps best illustrated in FIG. 3, the angled surfaces 52, 54 have a common apex 60 located above the passage opening 30 and defined by an intersection of perpendicular axes extending from the angled surfaces. Since the apparatus is fully submerged in the waterway, the angular orientation of the surfaces 52, 54 are selected so that the apex 60 is disposed within the waterway, i.e., the angle α shown in FIG. 3 is increased if the apex 60 is disposed closer to the opening 30 and likewise, the angle α is decreased if the height of the apex 60 above the opening is increased depending on the depth of the waterway.

As will be appreciated from FIGS. 1, 4, 5, and 6, the outer surfaces 52, 54 extend along the exterior of the housing in generally parallel relation, i.e., parallel to the passage and longitudinal axis LA. Although the disturbing means is illustrated as discrete planar, surface components 56 in the illustrated embodiment, it will be appreciated that other angles or curves, such as linear sine waves or pointed surfaces, that provide interruption of flow over the opening could be used without departing from the scope and intent of the present invention. That is, as the waterflow travels downstream, the surfaces 56 provided on either side of the passage on the surfaces 52, 54, disrupt or disturb what would otherwise be a laminar flow of the waterway flow above the apparatus. At approximately the apex, the disturbed flow emanating from the surface portions 56 disrupts the laminar flow and is believed to thereby allow the velocity of the flow through the passage 26 to decrease, uninfluenced by the external flow surrounding the apparatus.

For ease of manufacture, the disturbing means is integrally secured or mounted to the sidewalls 22, 24 of the housing. It will be appreciated that the disturbing means may be a separate structure S that interrupts or disturbs the laminar flow in the waterway around the passage without being secured directly to the housing.

Figure 4:
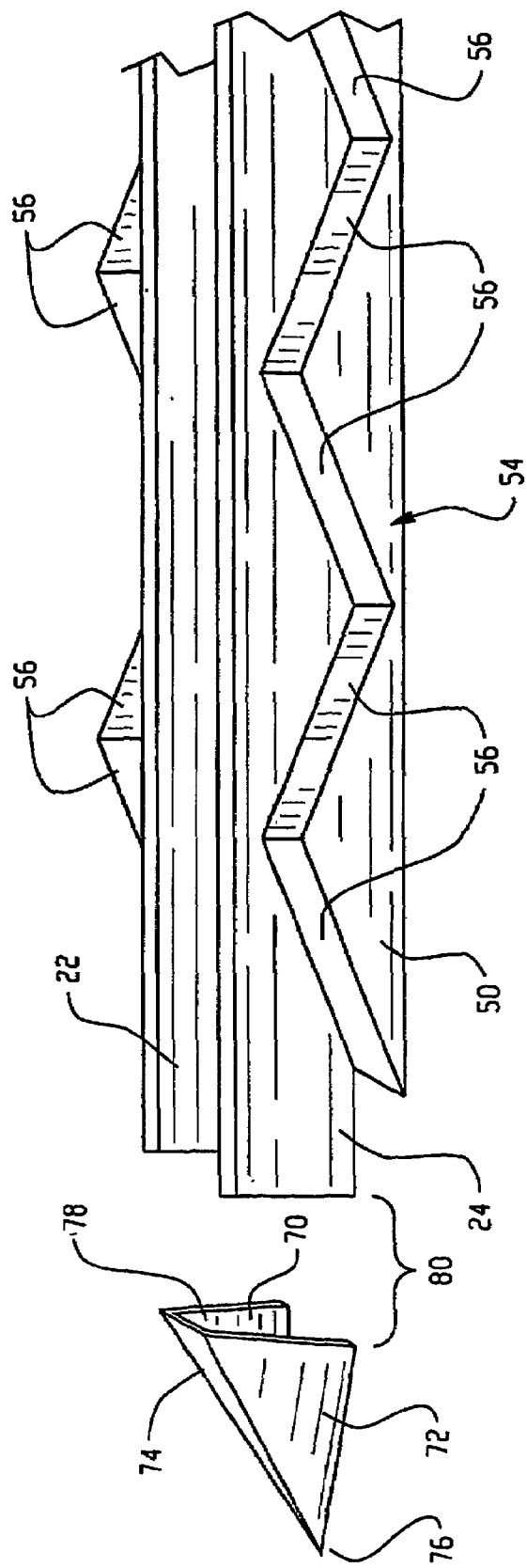
FIG. 4 is an elevation view of the apparatus.
Figure 5:
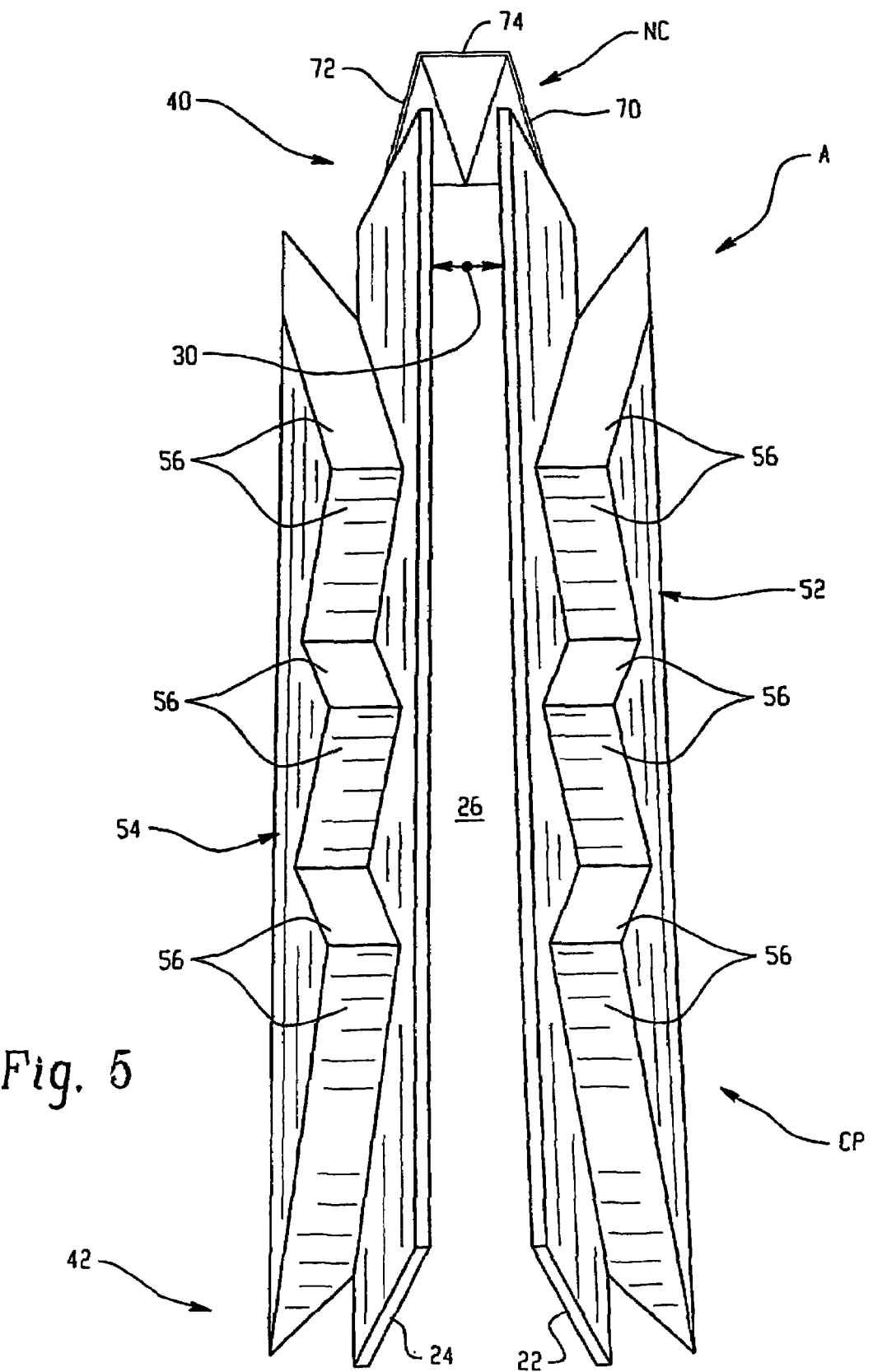
FIG. 5 is an overhead perspective view of the apparatus taken generally from an outlet end of the channel portion.
Figure 6:
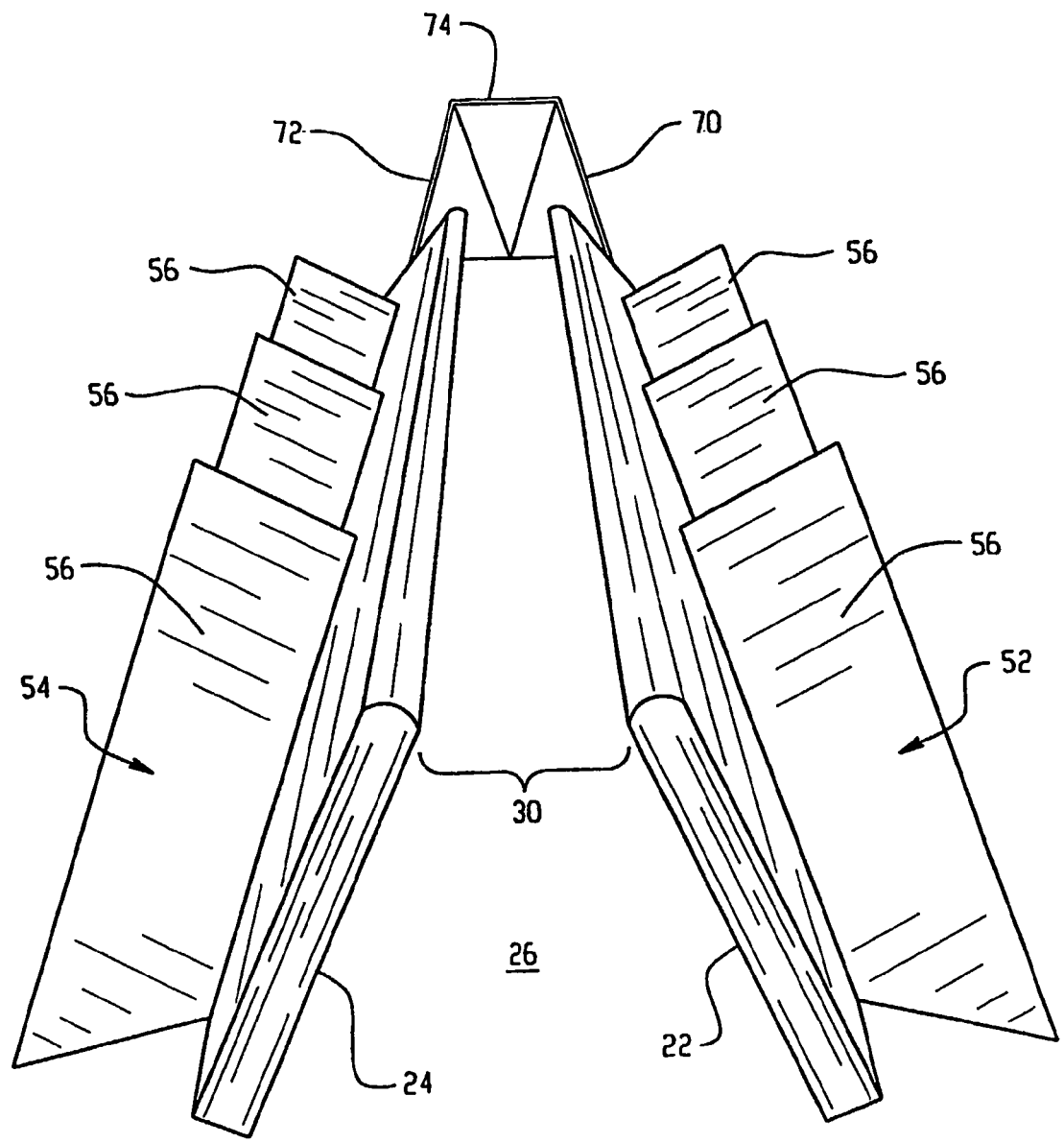
FIG. 6 is an end view of a prototype apparatus.

With continued reference to FIGS. 1 and 2, and as also illustrated in FIGS. 4 and 5, the deflector or nosecone portion NC is disposed in spaced relation adjacent the inlet end 40 of the passage. More particularly, the deflector in a simplified embodiment includes three generally planar surfaces disposed in angular relation relative to one another that together direct water from an upstream region of the waterway and deflect the water away from or around the inlet end 40 of the passage. Thus, outer angled surfaces 70, 72 direct water laterally outward away from the inlet end while the inclined surface 74 directs water over the inlet end of the passage. As is apparent from the FIGURES, the deflector has a narrowed, first end 76 and a wider, second end 78. It will also be appreciated from FIG. 2 that the second end 78, and particularly the second end of the inclined surface 74, terminates at approximately the same height as the height of the wall portions 22, 24 of the channel portion of the assembly. Of course, this configuration of the deflector is merely representative of one embodiment of deflector that directs the water around the inlet end, and one skilled in the art will appreciate that other configurations or conformations can be used with equal success.

The spaced location of the deflector relative to the channel portion may also be varied in response to forecasted or anticipated flow rates in the waterway. A gap 80 between the deflector and the channel portion allows fish migrating upstream to pass through the lower velocity passage 26 and exit at the inlet end 40 and proceed upstream around the deflector portion. Thus, one or more of these apparatus may be placed in the waterway to provide a reduced velocity flow for fish migration. For example, multiple apparatus can be disposed in side-by-side relation or staggered relation in the waterway where anticipated or calculated high velocity flow is encountered. It will also be appreciated that the channel portion would be typically formed in predetermined lengths. However, by assembling multiple channel portions in end-to-end relation, in conjunction with a single deflector upstream of the first channel portion, an elongated length bio-passage can be formed that provides the same results.

The apparatus can also be mounted on an incline, mounted beneath a bridge or in a road culvert, etc. where flow velocity can be reduced by approximately fifty percent, or more or less, if desired. The apparatus is fully scalable for use in a wide array of waterway sizes. Moreover, different materials of construction can be employed for ease of construction and installation. For example the illustrated prototype generally shows how the components are arranged, assembled, and interoperate, but a skilled artisan will recognize how easily the various components can be secured together in an alternate form that achieves other efficiencies such as ease of manufacture or installation. For example, it is contemplated that the entire assembly can be pre-cast or formed of concrete, including a supporting pad 44 that fixes the location of sidewalls, disturbing means, and the deflector relative to the passage. The weight of the concrete also helps to secure the apparatus in place, and use of concrete maintains the desired dimensional interrelationship between the components of the assembly. In some instances, the mere weight of the apparatus will dispense with the need for fasteners to secure the assembly in place.

It is also contemplated that the apparatus can be formed as an integral part of another component, for example, integrally formed within a road culvert, or a part of a bridge pier. Thus, use of the invention by itself or in combination with other structures does not impact on the function of the apparatus.

The invention has been described with reference to the preferred embodiments. Obviously, modifications and alterations will occur to others upon a reading and understanding of this specification. The invention is intended to include all such modifications and alterations insofar as they come within the scope of the appended claims or the equivalents thereof.

Having thus described the invention, it is now claimed:

1. An apparatus for reducing flow through an associated waterway, the apparatus comprising:
    a housing having an elongated passage dimensioned for receipt in the associated waterway such that a longitudinal axis of the passage is substantially aligned with a direction of waterway flow, the housing including at least one outer surface having a series of peaks and valleys facing over the passage, wherein the housing includes a second outer surface having a series of peaks and valleys facing over the passage; and
    a deflector located upstream of the passage and angled to direct water in the waterway around the passage.

2. The apparatus of claim 1 wherein the first and second outer surfaces are generally perpendicular to a common apex located above the passage.

3. The apparatus of claim 2 wherein the first and second outer surfaces extend generally parallel to the longitudinal axis of the passage.

4. The apparatus of claim 1 wherein the deflector is spaced from an inlet to the passage.

5. The apparatus of claim 1 wherein the deflector and the housing are joined together.

6. An apparatus for reducing flow through an associated waterway, the apparatus comprising:
    a housing having an elongated passage dimensioned for receipt in the associated waterway such that a longitudinal axis of the passage is substantially aligned with a direction of waterway flow, the housing including at least one outer surface having a series of peaks and valleys facing over the passage, wherein the passage has a generally trapezoidal cross-section that is wider at a base and narrower at an upper opening; and a deflector located upstream of the passage and angled to direct water in the waterway around the passage.

7. An apparatus for reducing flow through an associated waterway, the apparatus comprising:

a housing having an elongated passage dimensioned for receipt in the associated waterway such that a longitudinal axis of the passage is substantially aligned with a direction of waterway flow, the housing including at least one outer surface having a series of peaks and valleys facing over the passage, wherein the housing includes first and second sidewalls disposed in an acute angle relative to one another and terminating in spaced relation to define an upper opening that extends along the housing; and a deflector located upstream of the passage and angled to direct water in the waterway around the passage.

8. The apparatus of claim 7 wherein the first and second sidewalls are joined together.

9. The apparatus of claim 8 wherein the housing is joined to the deflector.

10. An apparatus for reducing flow through an associated waterway, the apparatus comprising:

a housing having an elongated passage dimensioned for receipt in the associated waterway such that a longitudinal axis of the passage is substantially aligned with a direction of waterway flow, the housing including at least one outer surface having a series of peaks and valleys facing over the passage, wherein the passage has a substantially uniform cross-section over its length and a deflector located upstream of the passage and angled to direct water in the waterway around the passage.

11. An apparatus for improving migration of fish through an associated waterway, the apparatus comprising:

a housing having a passage extending therethrough from an inlet end to an outlet end; and means mounted on the housing for disturbing laminar flow in the associated waterway above the passage, wherein the disturbing means includes first and second generally waved surfaces located on the housing and oriented generally perpendicular to a common apex located above the passage.

12. The apparatus of claim 11 wherein the generally waved surfaces extend along a length of the passage.

13. The apparatus of claim 11 further comprising a deflector disposed in spaced relation upstream of the inlet end of the passage whereby, in conjunction with the disturbing means, reduces flow rate through the passage irrespective of the flow rate external to the housing.

14. The apparatus of claim 13 wherein the housing includes first and second sidewalls disposed in angled relation and the passage is formed therebetween, the disturbing means located on the first and second sidewalls.

15. The apparatus of claim 14 wherein the sidewalls are integrally joined.

16. The apparatus of claim 15 wherein the deflector is integrally joined to the housing.

17. The apparatus of claim 11 wherein the housing is a concrete structure.

18. The apparatus of claim 11 further comprising means for securing the housing to an associated surface of the waterway.

* * * * *